(12) United States Patent
Bauer et al.

(10) Patent No.: US 7,393,105 B2
(45) Date of Patent: Jul. 1, 2008

(54) FILM GUIDE FOR A MOVIE CAMERA

(75) Inventors: Fritz Gabriel Bauer, Purkersdorf (AT); Josef Handler, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 10/588,408

(22) PCT Filed: Mar. 11, 2004

(86) PCT No.: PCT/DE2004/000555

§ 371 (c)(1),
(2), (4) Date: Aug. 3, 2006

(87) PCT Pub. No.: WO2005/076067

PCT Pub. Date: Aug. 18, 2005

(65) Prior Publication Data

US 2007/0121073 A1 May 31, 2007

(30) Foreign Application Priority Data

Feb. 4, 2004 (DE) ............... PCT/DE2004/000237

(51) Int. Cl.
*G03B 1/48* (2006.01)

(52) U.S. Cl. ..................................... 352/221; 352/229

(58) Field of Classification Search ................. 352/221, 352/224, 225, 226, 227, 229, 230
See application file for complete search history.

(56) References Cited

U.S. PATENT DOCUMENTS

| | | | |
|---|---|---|---|
| 3,871,760 A * | 3/1975 | Roth | 353/95 |
| 4,744,651 A * | 5/1988 | Beauviala | 352/225 |
| 5,184,158 A | 2/1993 | Grosser | |
| 6,457,827 B1 | 10/2002 | Groaser et al. | |
| 2002/0171808 A1 | 11/2002 | Quiroz | |

FOREIGN PATENT DOCUMENTS

DE  85 31 946.5 U1  2/1986

OTHER PUBLICATIONS

International Search Report, dated Oct. 14, 2004, corresponding to PCT/DE2004/000555.
English translation of International Preliminary Amendement dated Feb. 8, 2007 for PCT/DE2004/000555.

* cited by examiner

*Primary Examiner*—Rodney E Fuller
(74) *Attorney, Agent, or Firm*—Christie, Parker & Hale, LLP (57) ABSTRACT

A film guide for a movie camera having an image window which is arranged in a recording beam path of the movie camera, a gripper platform which is supported on the image window, between whose mutually facing film planes a film channel is formed through which a movie film is moved by a film transport mechanism, and a spacing window which is connected to the gripper platform. The spacing window is supported on the image window in such a manner that the film channel narrows to form a film gap between the mutually facing film planes of the image window and the spacing window.

22 Claims, 9 Drawing Sheets

FILM GUIDE FOR A MOVIE CAMERA

CROSS-REFERENCE TO A RELATED APPLICATION

This application is a National Phase Patent Application of International Patent Application Number PCT/DE2004/000555, filed on Mar. 11, 2004, which claims priority of International Patent Application Number PCT/DE2004/000237, filed on Feb. 04, 2004.

BACKGROUND

The invention relates to a film guide for a movie camera.

In order to provide a film guide for movie films in movie cameras, an image window section of an image window is arranged in the optical beam path of the recording objective of the movie camera. The image window section defines the size of the area of the individual images of the movie film to be exposed. Herein, the film plane of the image window section is opposite the film plane of a gripper platform and of a spacing window being integrated in the gripper platform in such a way that, between the two film planes, a film channel is formed between the image window and the gripper platform. In this way, a film gap is formed between the image window and the spacing window to guide the movie film. The film channel and film gap hold the movie film in one image plane, thus ensuring a constant level of contact with respect to the camera objective and thus a constant focusing plane for the movie film during the exposure of the individual images.

The film channel or film gap which is formed between the image window on the one hand and the gripper platform and the spacing window on the other hand is of such a size that, on the one hand, the focusing plane remains constant in the area of the image window section during exposure of the individual images of the movie film and, on the other hand, neither fluttering of the movie film nor increased friction between the movie film and the frame of the image window as well as of the film plane surface of the gripper platform and of the spacing window occurs, which would lead to noise, to damage to the movie film and to increased film transport resistance. In order to minimize the friction on the movie films during film transport through the film channel and film gap, the gripper platform has side sliding webs on which the normally perforated edge of the movie film slides, and the spacing window has so-called sliding webs which, for example, extend in the movement direction of the movie film and rest against the rear face of the movie film, so that the entire surface of the movie film does not make contact with the spacing window.

DE 85 31 946 U1 discloses a movie film recording camera having guide surfaces which form a film guide channel, via which the film is passed, such that it slides, in feed and take-up areas to and from an image window and in the area of the image window, to be precise between the image window and a film contact-pressure plate. In order to ensure minimal and uniform friction in the film guide channel, and thus easy sliding as well as a minimal load on and damage to the film during film transport, even in the event of major temperature fluctuations, the guide surfaces have a corrugated surface, with the corrugation peaks and corrugation troughs being arranged transversely with respect to the film running direction.

For intermittent film transport, a film transport mechanism is provided in a movie camera and has a gripper switching mechanism which is arranged in a drive module and has one or more gripper tips on a single-sided or double-sided gripper, which engage through elongated opening slots in the gripper platform in the film perforations which are arranged at the side of the film images to be exposed, and transports the movie film onwards by one film image in each case for each film transport step. When the film image is in the stationary phase, at least one blocking gripper engages through a hole in the gripper platform in the film perforation in the movie film, and ensures that the image is stationary while the film is being exposed.

In order to make it easier to insert the movie film into a movie camera, the drive module can be moved or pivoted with respect to the image window together with the spacing window which is supported on the gripper platform of the drive module, so that the film channel between the image window and the gripper platform and the film gap between the image window and the spacing window are enlarged in order to hold the movie film. The spacing window is connected to the gripper platform via adjusting screws, which support the spacing window on the gripper platform, with the spacing window being sprung with respect to the gripper platform via one or more contact-pressure levers. This results in the size and parallelity of the film gap being ensured via a plurality of moving parts, specifically via the adjusting screws, the springing and the gripper platform which moves with the drive module.

After movement or pivoting of the drive module for insertion of a movie film, this can lead, for example, to the size of the film channel and/or film gap being increased or decreased and to loss of parallelity between the opposite image planes of the image window and of the spacing window, so that the focusing plane is not ensured in all areas of the film channel and film gap, and/or excessive friction of the movie film occurs.

SUMMARY OF THE INVENTION

In an exemplary embodiment of the present invention is to specify a film guide of the type mentioned in the introduction, in which a constant size, which can be preset, and parallelity are ensured for a film channel and/or film gap which are/is formed between an image window and a gripper platform and/or a spacing window, with wide tolerance requirements.

The solution according to the invention ensures that a constant parallel film channel and film gap, which can be preset, are maintained between the image window and the gripper platform and/or the spacing window of a movie camera, thus ensuring exact maintenance of a focusing plane on the one hand and of defined friction conditions on the other hand with wide tolerance requirements and correspondingly low production costs.

The solution according to the invention can be applied both to the film channel which is formed between the image window and the gripper platform and to the film gap which is formed between the image window and the spacing window. In this case, the size and parallelity of the film channel are governed exclusively by the support of the gripper platform on the image window, and the size and parallelity of the film gap are governed by the support of the spacing window on the image window, thus avoiding the dependency of the film channel on the support of the gripper platform by means of undefined contact surfaces on the image window, and the dependency of the film gap, which is formed between the spacing window and the image window, on the sprung connection of the spacing window to the gripper platform, so that the predetermined size and parallelity either of the film channel or of the film gap or of both the film channel and the film gap are ensured even during movement and/or pivoting of the gripper platform, which is connected to the drive module, for film insertion.

The gripper platform and/or the spacing window are/is preferably supported on at least one contact surface of the image window via a plurality of projections in the form of spacers, with the projections being corner points of a geometric figure.

In one preferred embodiment, the gripper platform and/or the spacing window is or are supported on the at least one contact surface of the image window via three projections, with the first and second projections on the gripper platform and/or on the spacing window being arranged on a side edge of the gripper platform and/or of the spacing window which run/runs parallel to the movement direction of the movie film, and the third projection being arranged on the opposite side edge of the gripper platform and/or of the spacing window, preferably centrally between the first and second projections.

Alternatively, the gripper platform and/or the spacing window can be supported on the at least one contact surface of the image window via in each case one projection, which is preferably in the form of a web or is flat, or can be supported on the at least one contact surface of the image window via in each case at least two projections which are arranged on each side of the gripper platform and/or of the spacing window.

The support of the gripper platform and/or of the spacing window directly on the image window via the projections or webs and in particular via the three projections which are arranged at the corner points of an equilateral triangle results in the size and parallelity of the film channel and/or of the film gap being governed exclusively by the machining, which can be carried out very accurately, of a part of the gripper platform and/or of the spacing window, specifically by means of the projections.

While, if the image window is grooved or is provided with a depression in the film image area, the projections which are arranged on the spacing window are supported on a plane which is stepped from the film plane of the image window, the projections can also be supported directly on the film plane of the image window by using an image window which does not have grooves or a depression in the central area.

In one preferred embodiment of the solution according to the invention, the spacing window is preferably sprung via a contact-pressure lever with respect to the gripper platform which holds the spacing window and, in particular, is part of a drive module which contains the film transport mechanism.

In order to insert the movie film into the film guide in the movie camera and in order to remove the movie film from the film guide in the movie camera, the drive module, which is preferably arranged such that it can be pivoted and/or moved in the camera housing, can be designed such that it can be moved and/or pivoted with respect to the image window.

BRIEF DESCRIPTION OF THE DRAWINGS

The idea on which the invention is based will be explained in more detail with reference to one exemplary embodiment, which is illustrated in the figures, in which.

DETAILED DESCRIPTION

Figure 1:
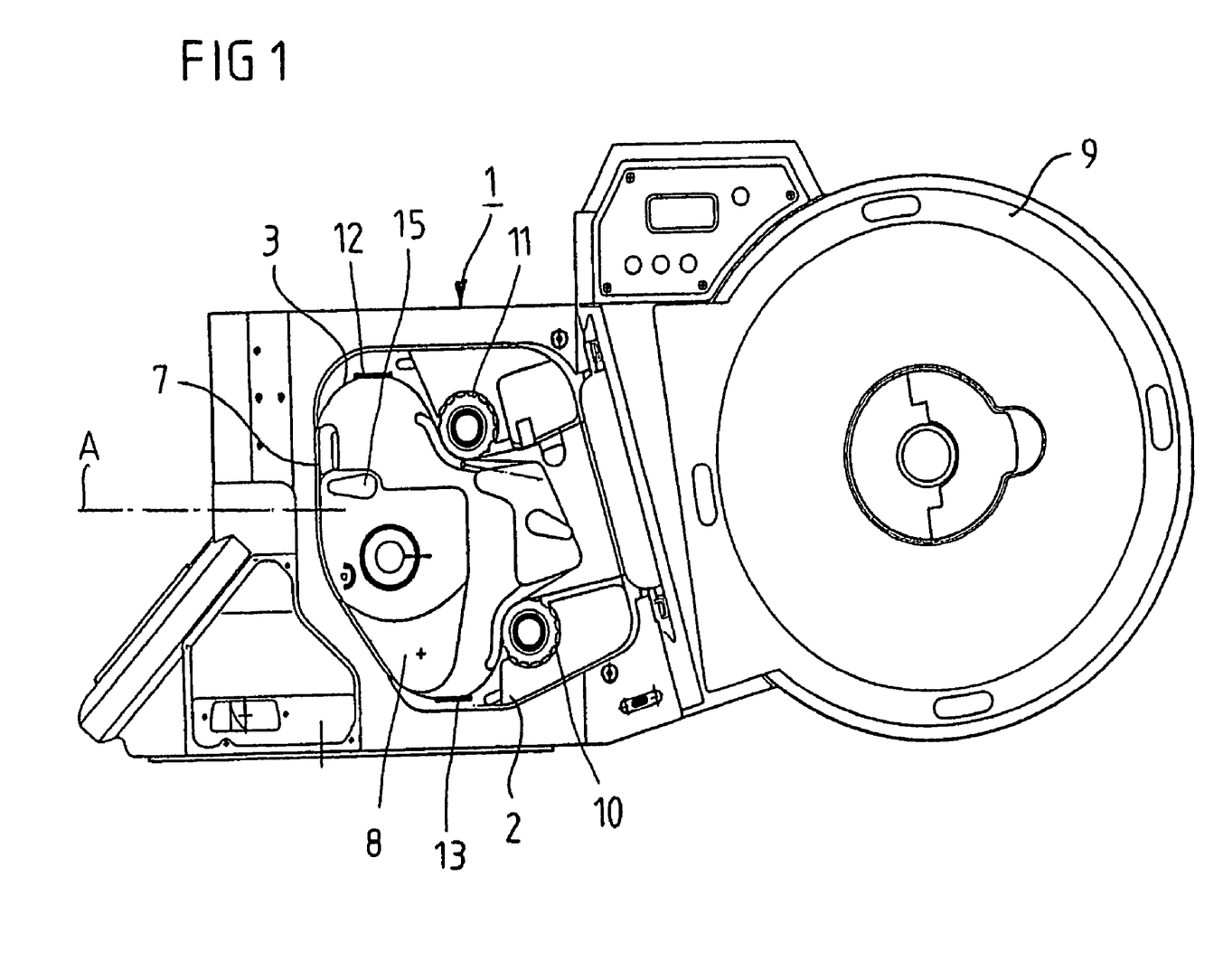
FIG. 1 shows a side view of a camera housing of a movie camera with a drive module.

FIG. 1 shows a side view of a movie camera with a camera housing 1, with a film cassette 9 fitted, and with a film transport mechanism which is in the form of a drive module 2, with the camera door open. The film transport mechanism has a feed device 10 and a take-up device 11 for continuous film transport and in order to form film loops 12, 13 on both sides of an image window section, which is arranged in the recording beam path A, of an image window, and has a gripper mechanism 8 with a film transport motor, by means of which the movie film 3 is transported intermittently in a film guide. In the area of the recording beam path A, the film guide forms a film channel 7 between the image window, which is connected to the camera housing 1, and a gripper platform, which is connected to the drive module 2, of the gripper mechanism 8, which narrows to form a film gap in the area between the image window and a spacing window, which is connected to the gripper platform.

The movie film 3 is moved intermittently by means of the gripper mechanism and is positioned in front of the image window section, which is arranged in the recording beam path A of the image window in order to expose individual film images, with this image window section determining the area of the individual film images to be exposed. The gripper mechanism 8 and with it the gripper platform and the spacing window can be moved or pivoted by operation of a lever 15, so that the film channel 7 and/or the film gap are/is enlarged for insertion of a movie film 3. Once the film has been inserted, the gripper mechanism 8 is pivoted back, thus once again forming the film channel 7 which is intended for film transport, and which, for example when using a movie film with a maximum film thickness of 0.16 mm, is nominally 0.23 mm, while the film gap is nominally 0.175 mm.

Figure 2:
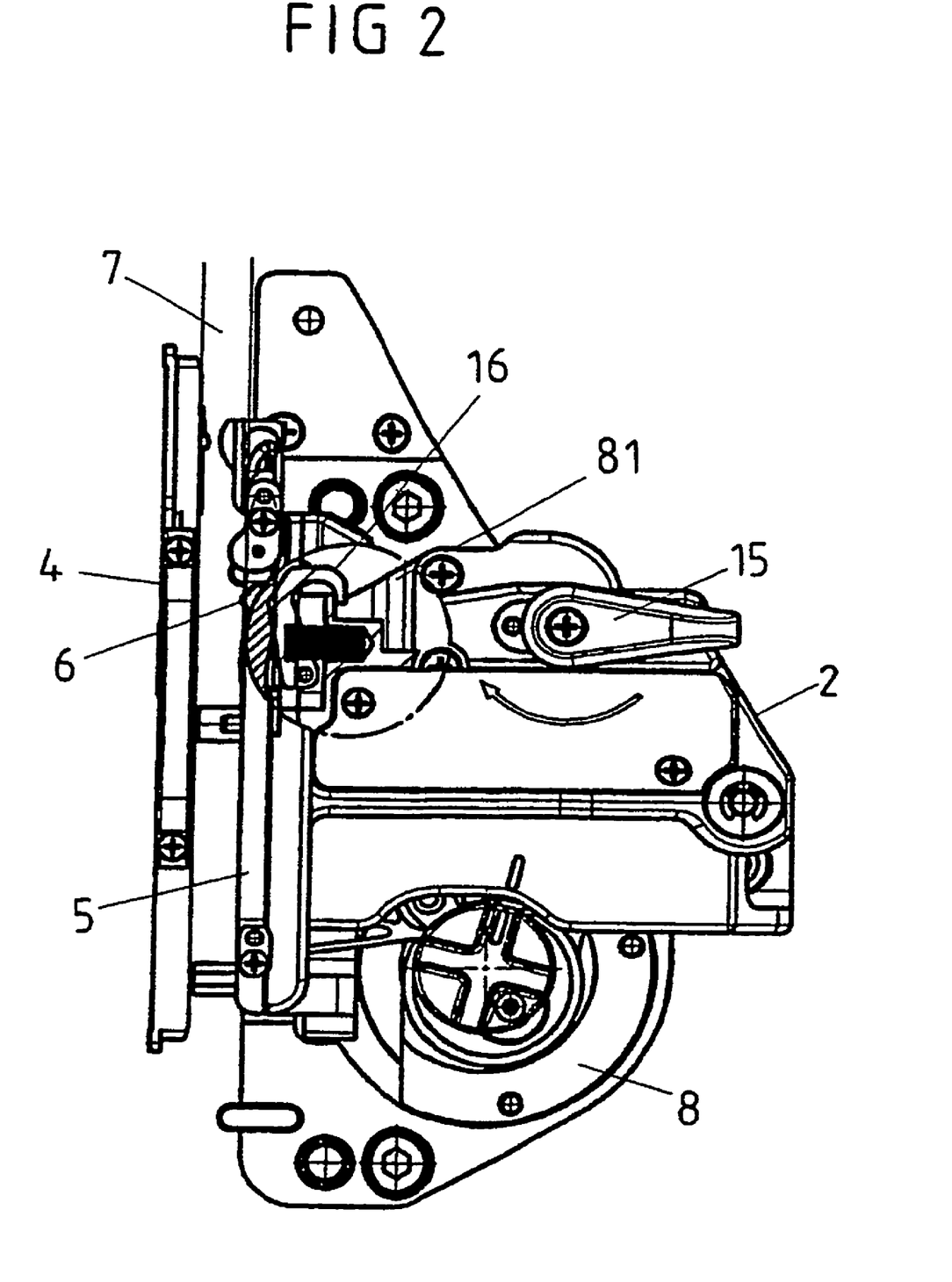
FIG. 2 shows a side view of the film guide of the movie camera between an image window and a spacing window which is connected to the drive module.

FIG. 2 shows a side view of the image window 4 and of the gripper mechanism 8 as part of the drive module 2 with a spacing window 6, which is sprung with respect to the gripper platform 5 of the gripper mechanism 8, in a film insertion position, that is to say in a position in which the gripper mechanism 8 has been moved in order to enlarge the film channel 6 and with it the film gap, in order to make it easier to insert the film. Once the film has been inserted, the gripper mechanism 8 is moved or pivoted in the direction of the image window 4 again, thus reproducing the nominally set film channel 6 and film gap.

Figure 3:
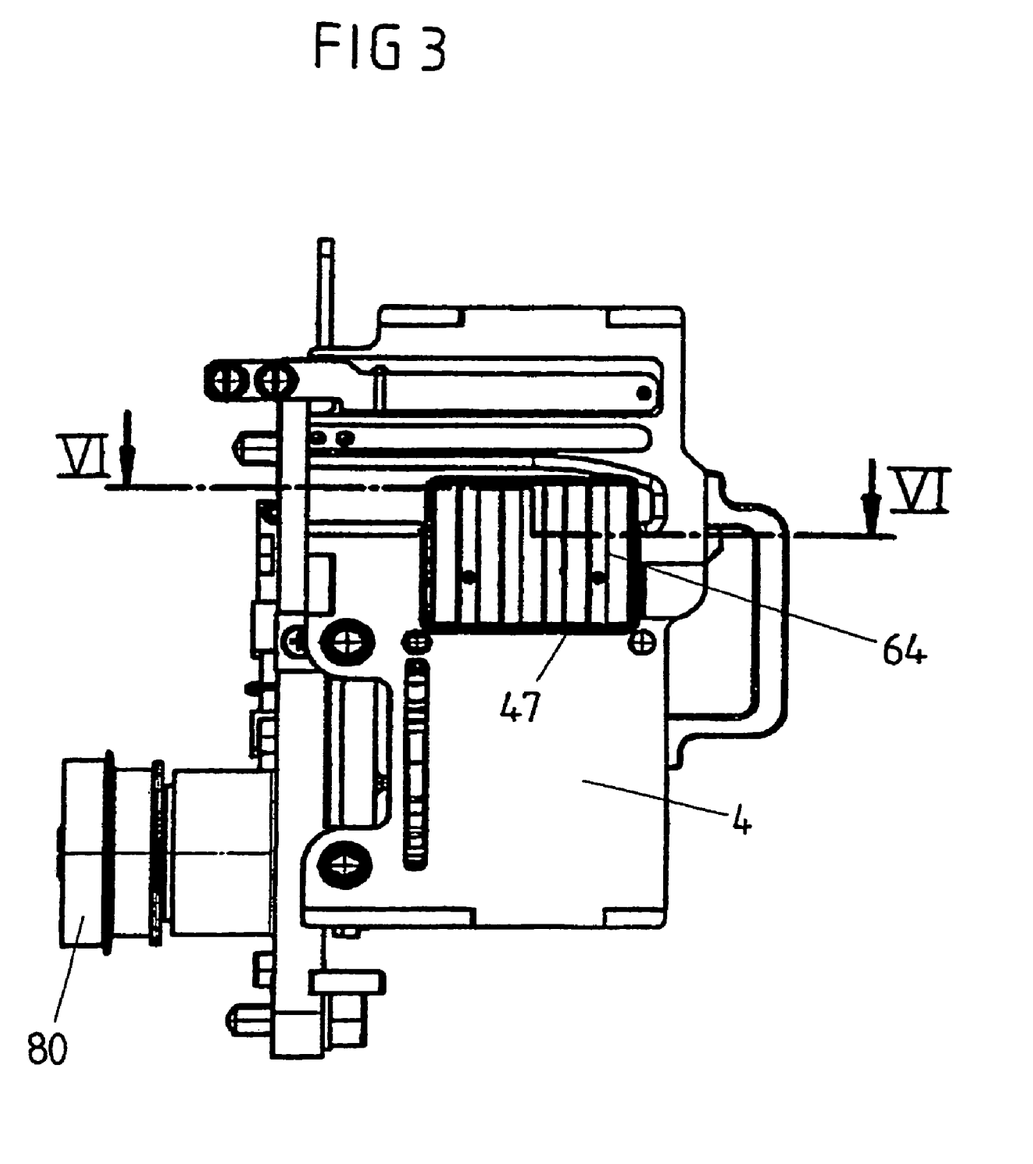
FIG. 3 shows a rear view of the image window gripper platform with the gripper platform and gripper mechanism behind it.

FIG. 3 shows a plan view of the arrangement shown in FIG. 2 from the side of the image window 4, with the gripper mechanism 8 located behind it and with the film transport motor 80 of the gripper mechanism 8 as well as the image window section 47 of the image window 4, and sliding webs 64 on the spacing window, which is aligned with the image window section 47.

The film guide is composed of the image window 4, the gripper platform 5 and the spacing window 6. The image window section 47 of the image window 4 defines the size of the area of the individual images of the movie film to be exposed. The film plane 40 (see FIG. 7) of the image window section 47 is opposite the film plane 60 of the gripper platform 5 and of the spacing window 6 being integrated into the gripper platform 5 in such a way that, between the two film planes 40, 60, the film channel 7 is formed between the image window 4 and the gripper platform 5. In this way, a film gap 70 (see FIG. 7) is formed between the image window 4 and the spacing window 6 to guide the movie film 3. The film channel 7 and film gap 70 hold the movie film 3 in one image plane, thus ensuring a constant level of contact with respect to the camera objective and thus a constant focusing plane for the movie film 3 during the exposure of the individual images.

According to the instant invention, the spacing window 6 is supported on the image window 4 in such a manner that the film channel 7 narrows to form a film gap 70 between the mutually facing film planes 40, 60 of the image window 4 and the spacing window 6.

Figure 4:
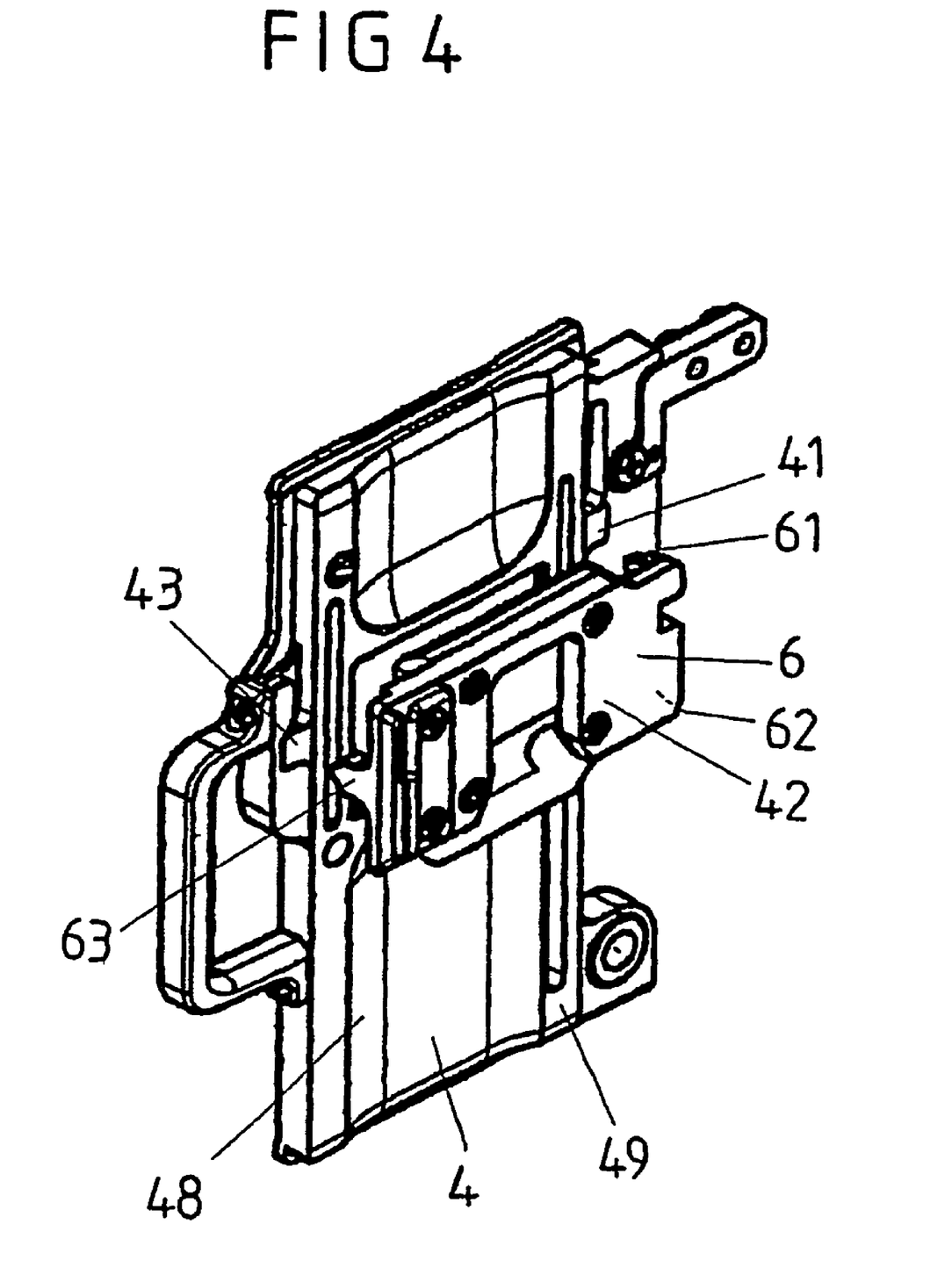
FIG. 4 shows a perspective illustration of the image window and spacing window.
Figure 5:
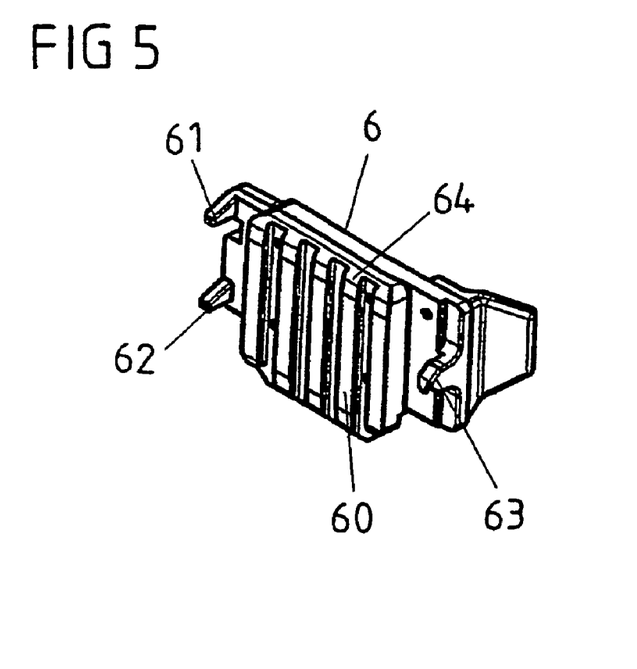
FIG. 5 shows a perspective illustration of a spacing window with three projections.

FIG. 4 shows a perspective illustration of the association between the image window 4 and the spacing window 6, which is illustrated in the form of a perspective enlarged view in FIG. 5.

In order to ensure a constant and parallel film gap between the image window 4 and the spacing window 6, the spacing window 6 has three projections 61, 62, 63 which are arranged at the side of a contact surface or film plane 60 (FIG. 5) of the spacing window 6 with a plurality of sliding webs 64 at the corner points of an equilateral triangle. The projections 61, 62, 63 have associated contact surfaces 41, 42, 43 on the image window 4, which, depending on the embodiment of the image window 4, are arranged on the film plane 40 of the image window 4 or on a plane of the image window 4 which is stepped with respect to the film plane 40, in particular on raised side sliding webs 48, 49.

The arrangement of the projections 61, 62, 63 at the corner points of an equilateral triangle is, however, not essential, and any other desired configuration may also be chosen. Alternatively, two projections, preferably in the form of elongated webs or as surfaces, can be provided on each side of the spacing window 6, or in each case at least two or more projections can be provided on each side of the spacing window 6, with any desired number on both sides, and/or with the same or different intervals and alignments.

Figure 6:
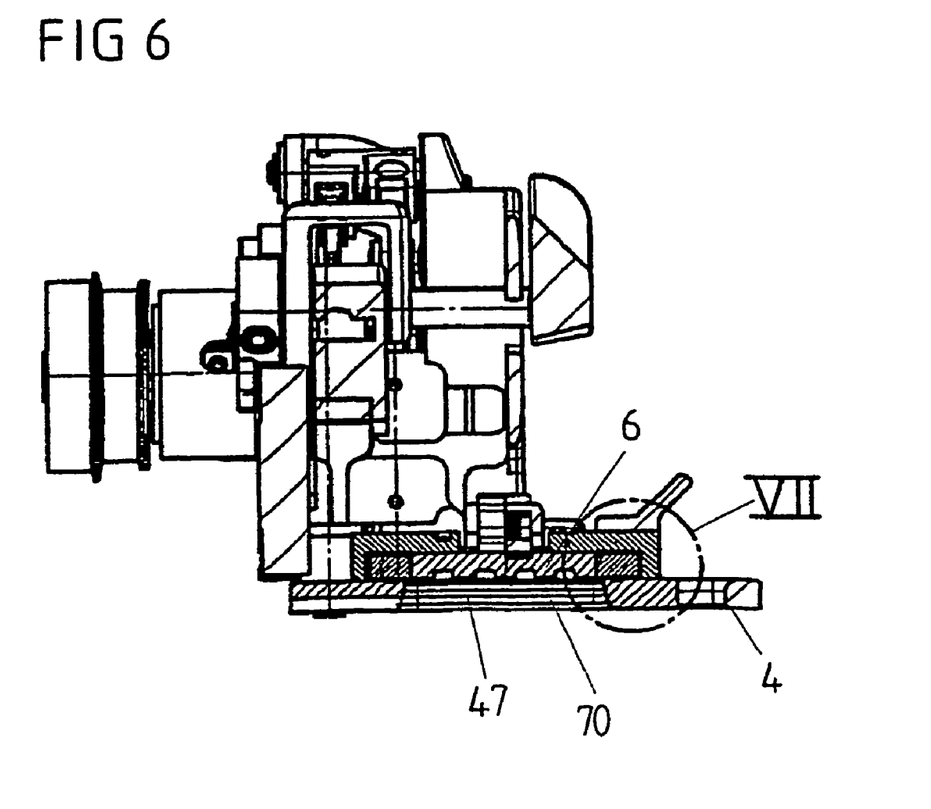
FIG. 6 shows a section through the view shown in FIG. 3, along the line VI-VI.

FIG. 6 shows relationships for the formation of the nominal film gap 70 in the form of a section along the line VI-VI as shown in FIG. 3, that is to say with the gripper mechanism 8 having been pivoted back or moved back after insertion of the film.

Figure 7:
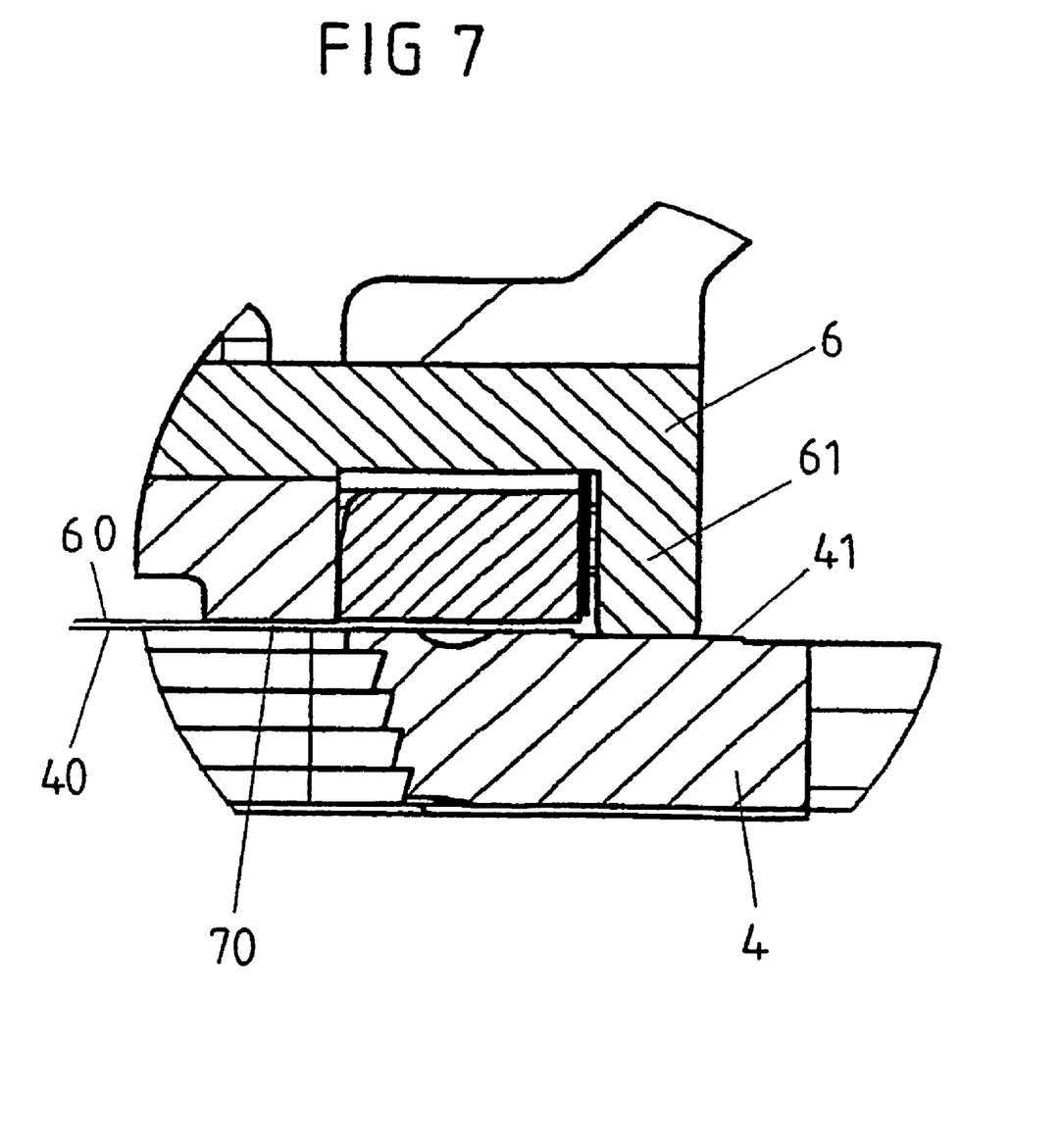
FIG. 7 shows an enlarged illustration of the detail VII shown in FIG. 6.

FIG. 7 shows an enlarged illustration of the detail VII from FIG. 6 with the image window 4 and the spacing window 6, which is supported by means of the projections 61, 62, 63 on the contact surfaces 41, 42, 43 of the image window 4, with FIG. 7 showing the contact between the projection 61 and the contact surface 41. The film plane 40 of the image window 4 forms the front surface of the film gap 70, while the rear surface of the film gap 70 is formed by the film plane 60 of the spacing window 6.

Figure 8:
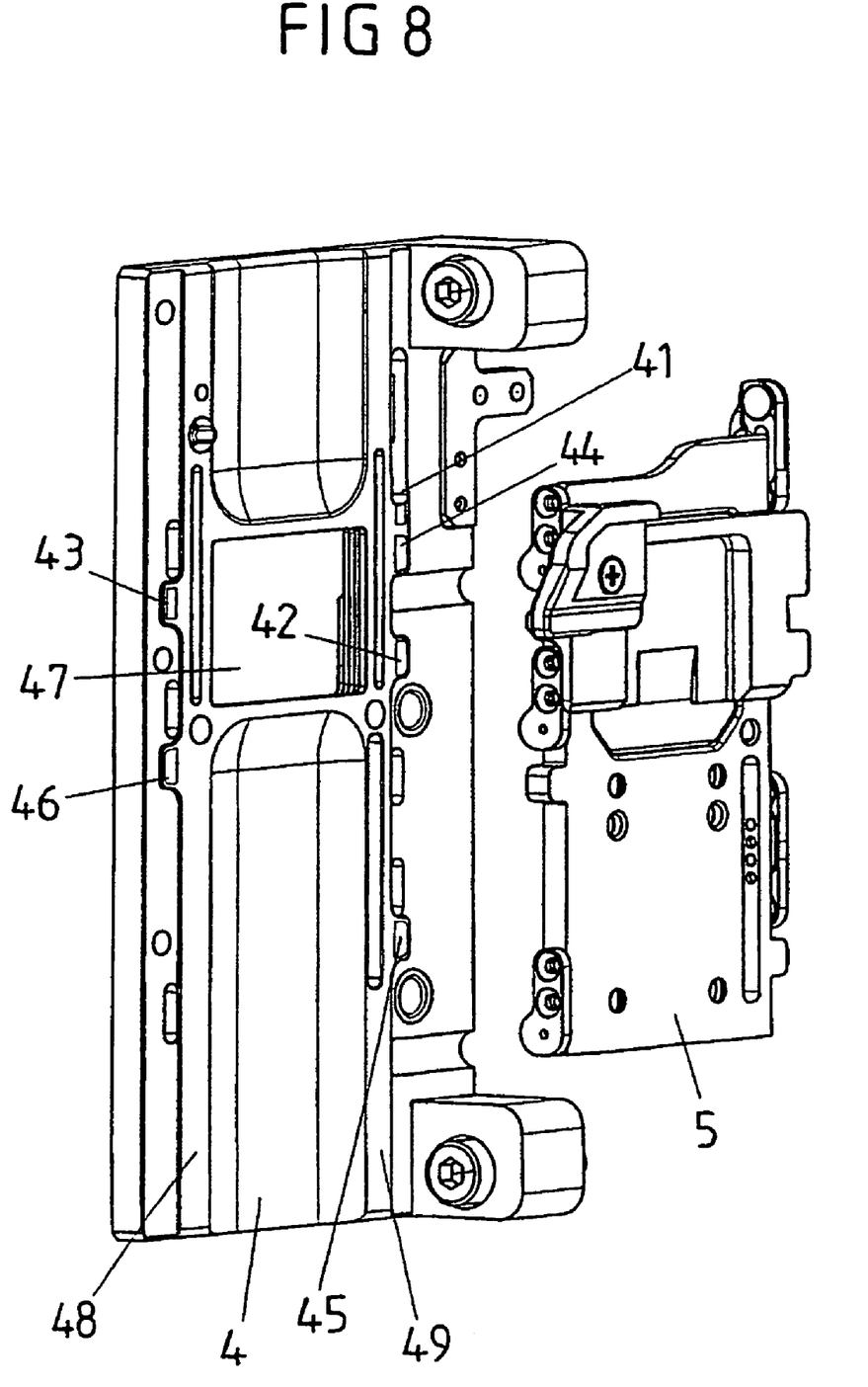
FIG. 8 shows a perspective view of the film plane and of the image window, and the rear face of the gripper platform, facing away from the film plane.

FIG. 8 shows a perspective view of the film plane of the image window 4 as well as the rear face of the gripper platform 5 facing away from the film plane. Contact surfaces 41-46 are formed as side bulges on the raised sliding webs 48, 49, which run at the side of the image window section 47 in the longitudinal direction of the image window 4 and along which the perforated edges of the movie film 3 run during film transport, of which the contact surfaces 41, 42, 43 are in the form of contact surfaces for the projections 61, 62, 63 (which are provided as spacers) on the spacing window 6, and the contact surfaces 44, 45, 46 are provided as contact surfaces for the projections 51, 52, 53 (which are provided as spacers) on the gripper platform 5. The contact between the projections 51, 52, 53 on the gripper platform 5 and the contact surfaces 44, 45, 46 of the image window 4 forms a defined film channel, nominally of 0.23 mm, between the image window 4 and the gripper platform 5.

Figure 9:
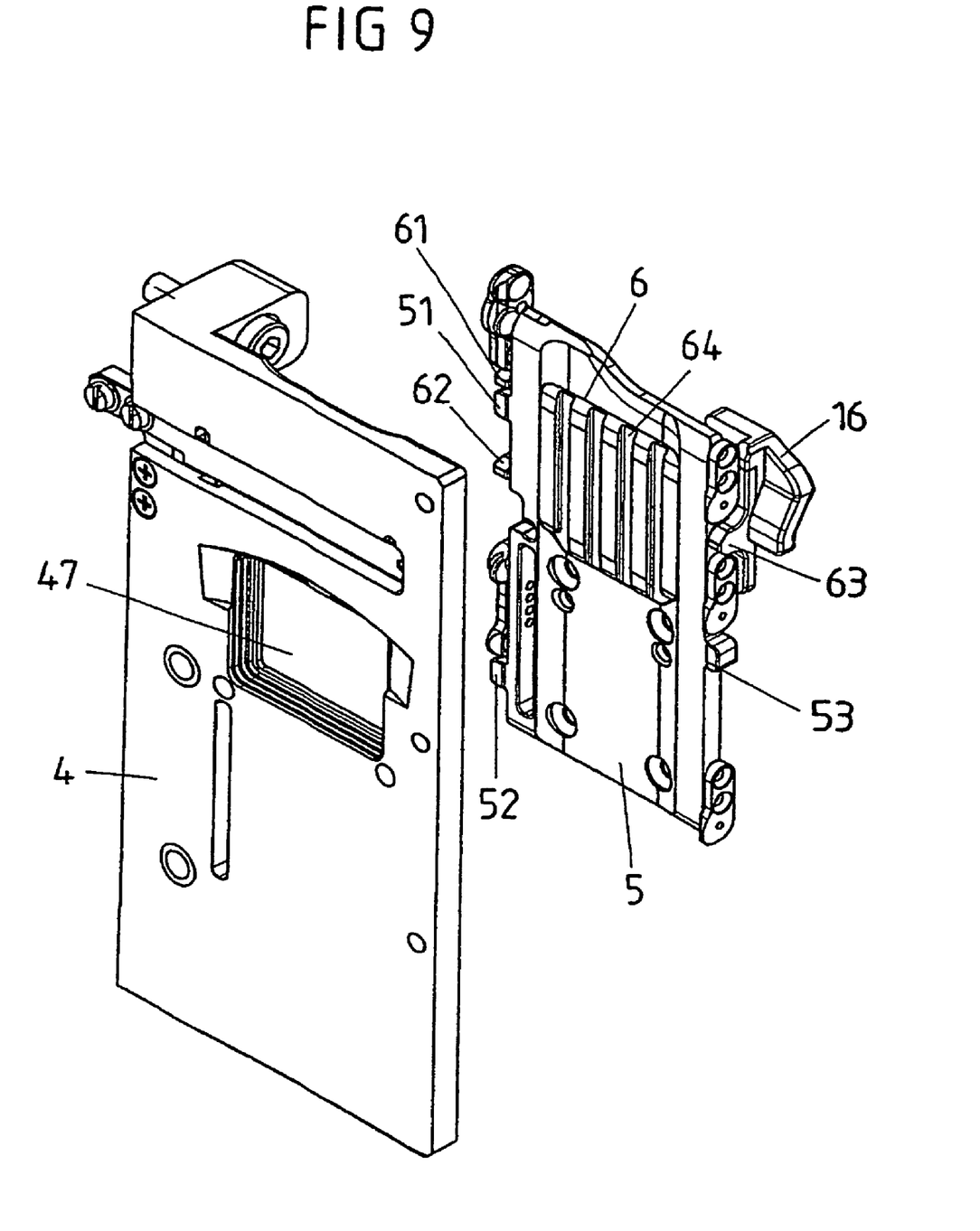
FIG. 9 shows a perspective view of the film plane of the gripper platform and of the spacing window, and of the rear face of the image window, facing away from the film plane.

FIG. 9 shows a perspective view of the film plane of the gripper platform 5 with the spacing window 6, which is connected in a sprung manner to the gripper platform 5, as well as the rear face of the image window 4, facing away from the film plane, with the image window section 47 arranged in it. The gripper platform 5 has three projections 51, 52, 53 which are arranged approximately at the points of an equilateral triangle, of which the projections 51 and 52 are arranged on one longitudinal side of the gripper platform 5, and the other projection 53 is arranged on the other longitudinal side of the gripper platform 5. During film transport, the projections 51, 52, 53 make contact with the contact surfaces 44, 45, 46 of the image window 4, so that the defined film channel 7 is formed between the gripper platform 5 and the image window 4. At the same time, the projections 61 to 63 on the spacing window 6, which is connected in a sprung manner to the gripper platform 5, make contact with the contact surfaces 41 to 43 of the image window 4 and form a film gap, nominally of 0.175 mm, on the focusing plane of the movie film.

Figures 10, 11, 12:
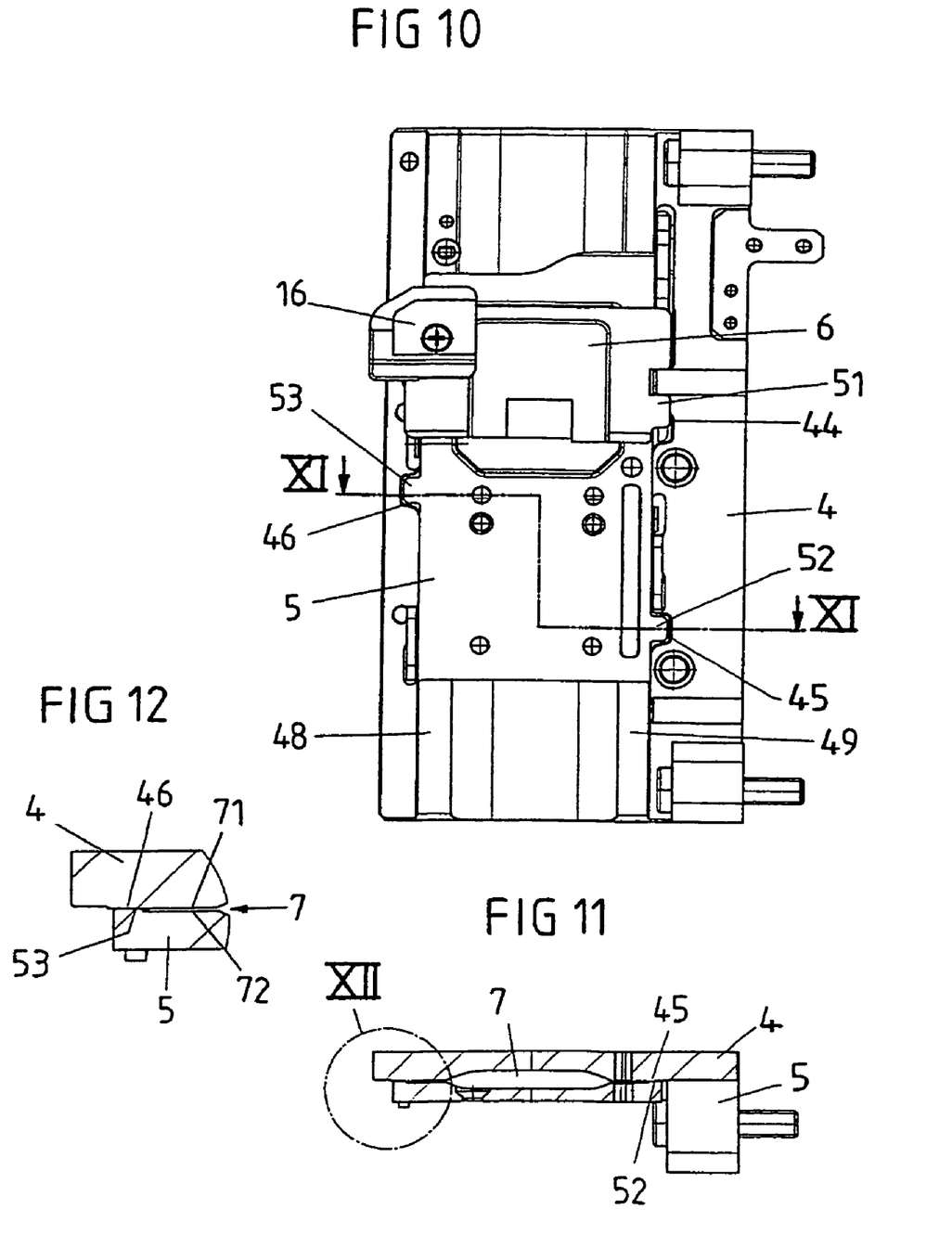
FIG. 10 shows a view of the film plane of the image window, and the rear face of the gripper platform.
FIG. 11 shows a section through the arrangement shown in FIG. 10, along the line XI-XI.
FIG. 12 shows an enlarged illustration of the detail XII shown in FIG. 11.

FIG. 10 shows a plan view of the association between the gripper platform 5 and the image window 4 when the image window 4 and the gripper platform 5 are joined together, that is to say in a state after insertion of the film and with the movie camera ready to record films.

The side view shown in FIG. 10 shows the contact surfaces 44, 45, 46 (which project at the side of the sliding webs 48, 49 of the image window 4) for holding the projections 51, 52, 53 of the gripper platform 5, which are arranged on one longitudinal side or the other of the gripper platform 5. In addition, FIG. 10 shows a view of the rear face of the spacing window 6, which is pressed in a sprung manner against the gripper platform 5 by means of the contact-pressure lever 16.

Instead of the projections 51, 52, 53 and contact surfaces 44, 45, 46 which are arranged on one longitudinal side or the other of the image window 4 and of the gripper platform 5, it is also possible to provide continuous webs on both sides, or in each case two or more projections and associated contact surfaces on each side, of the gripper platform 5 and of the image window 4.

In a section along the line XI-XI as shown in FIG. 10, FIG. 11 shows the relationships when the nominal film channel 7 is formed between the gripper platform 4 and the image window 5, with the drive module pivoted back or pushed back, and with the gripper platform 5 attached to it, for example after insertion of the film. The film channel 7 is defined by the contact between the projections 51, 52, 53 as shown in FIG. 10, of which the projections 52 and 53 are illustrated in FIG. 11, and the contact surfaces 44, 45, 46, of which the contact surfaces 45 and 46 are illustrated in FIG. 11.

FIG. 12 shows an enlarged illustration of the detail XII shown in FIG. 11 with a part of the image window 4 and of the gripper platform 5 in the area in which the gripper platform 5 is supported on the image window 4 via the projection 53 and the contact surface 46, in order to form the defined, nominal film channel 7, for example of 0.23 mm, between the front surface 71, which is formed on the image window 4, and the rear surface 72, which is formed on the gripper platform 5, of the film channel 7.

The invention claimed is:

1. A film guide for a movie camera having an image window which is arranged in the recording beam path of the movie camera and having a spacing window which is arranged on a gripper platform, between whose mutually facing film planes a film channel or film gap is formed through which the movie film is moved by means of a film transport mechanism, wherein the gripper platform or the spacing window is supported on the image window, and wherein the gripper platform and/or the spacing window is supported on at least one contact surface of the image window via at least three projections, wherein the projections define corner points of a geometric figure.

2. The film guide of claim 1, wherein the gripper platform and/or the spacing window are/is supported on at least one contact surface of the image window via a plurality of projections which are in the form of spacers.

3. The film guide of claim 2, wherein the gripper platform and/or the spacing window are/is supported on the at least one contact surface of the image window via in each case one projection, which is preferably in the form of a web or is flat.

4. The film guide of claim 2, wherein the gripper platform and/or the spacing window are/is supported on the at least one contact surface of the image window via in each case at least two projections, which are arranged on each side of the gripper platform and/or of the spacing window.

5. The film guide of claim 1, wherein the projections are supported on the film plane of the image window.

6. The film guide of claim 1, wherein the spacing window is sprung with respect to the gripper platform which holds the spacing window.

7. A film guide for a movie camera having an image window which is arranged in the recording beam path of the movie camera and having a spacing window which is arranged on a gripper platform, between whose mutually facing film planes a film channel or film gap is formed through which the movie film is moved by means of a film transport mechanism, wherein the gripper platform or the spacing window is supported on the image window, and wherein the gripper platform and/or the spacing window is supported on at least one contact surface of the image window via plurality of projections which are in the form of spacers, wherein the gripper platform and/or the spacing window are/is supported on the at least one contact surface of the image window via three projections.

8. The film guide of claim 7, wherein the first and second projections on the gripper platform and/or on the spacing window are arranged on a side edge of the gripper platform and/or of the spacing window which run/runs parallel to the movement direction of the movie film, and the third projection is arranged on the opposite side edge of the gripper platform and/or of the spacing window, preferably centrally between the first and second projections.

9. A film guide for a movie camera having an image window which is arranged in the recording beam path of the movie camera and having a spacing window which is arranged on a gripper platform, between whose mutually facing film planes a film channel or film gap is formed through which a movie film is moved by means of a film transport mechanism, wherein the gripper platform or the spacing window is supported on the image window, characterized in that the spacing window is sprung via a contact-pressure lever.

10. A film guide for a movie camera having an image window which is arranged in the recording beam path of the movie camera and having a spacing window which is arranged on a gripper platform, between whose mutually facing film planes a film channel or film gap is formed through which a movie film is moved by means of a film transport mechanism, wherein the gripper platform or the spacing window is supported on the image window, wherein the gripper platform is part of a drive module which contains the film transport mechanism.

11. A film guide for a movie camera having an image window which is arranged in the recording beam oath of the movie camera and having a spacing window which is arranged on a gripper platform, between whose mutually facing film planes a film channel or film gap is formed through which a movie film is moved by means of a film transport mechanism, wherein the gripper platform or the spacing window is supported on the image window, wherein a drive module is arranged in the camera housing such that it is pivotable and/or movable.

12. A film guide for a movie camera having an image window which is arranged in the recording beam path of the movie camera and having a spacing window which is arranged on a gripper platform, between whose mutually facing film planes a film channel or film gap is formed through which a movie film is moved by means of a film transport mechanism, wherein the gripper platform or the spacing window is supported on the image window, wherein a drive module is movable and/or pivotable with respect to the image window in order to insert a movie film into the film channel which is formed between the image window and the gripper platform.

13. A film guide for a movie camera comprising:
an image window which is arranged in the recording beam path of the movie camera, and
a gripper platform which is supported on the image window, between whose mutually facing film planes a film channel is formed through which a movie film is moved by means of a film transport mechanism; and
a spacing window coupled to the gripper platform,
wherein the spacing window is supported on the image window in such a manner that the film channel narrows to form a film gap between the mutually facing film planes of the image window and the spacing window, and wherein at least one of the gripper platform and the spacing window is supported on the at least one contact surface of the image window via at least three projections.

14. The film guide of claim 13, wherein the projections define corner points of a geometric figure.

15. The film guide of claim 13, wherein first and second projections of said at least three projections are arranged on a side edge of the at least one of said gripper platform and said spacing window wherein said side edge runs parallel to a movement direction of the movie film, and a third projection of said at least three projections is arranged on an opposite side edge of the at least one of said gripper platform and said spacing window.

16. The film guide of claim 15, wherein the spacing window is sprung via a contact-pressure lever.

17. The film guide of claim 13, wherein a first of said at least three projections is located centrally between a second and a third of said at least three projections.

18. The film guide of claim 17, wherein the first of said at least three projections is not aligned along a line defined by said second and third of said at least three projections.

19. The film guide of claim 13, wherein the gripper platform is supported on at least one contact surface of the image window via a plurality of said projections.

20. The film guide of claim 13, wherein the gripper platform is part of a drive module which contains the film transport mechanism.

21. The film guide of claim 13, wherein the drive module is arranged in the camera housing such that it is pivotable and/or movable.

22. The film guide of claim 13, wherein the drive module is movable and/or pivotable with respect to the image window to allow for insertion of a movie film into the film channel which is formed between the image window and the gripper platform.

* * * * *